United States Patent
Tseng

(10) Patent No.: US 11,301,669 B2
(45) Date of Patent: Apr. 12, 2022

(54) FACE RECOGNITION SYSTEM AND METHOD FOR ENHANCING FACE RECOGNITION

(71) Applicant: PEGATRON CORPORATION, Taipei (TW)

(72) Inventor: Yu-Hung Tseng, Taiepi (TW)

(73) Assignee: PEGATRON CORPORATION, Taipei (TW)

( * ) Notice: Subject to any disclaimer, the term of this patent is extended or adjusted under 35 U.S.C. 154(b) by 59 days.

(21) Appl. No.: 16/431,513

(22) Filed: Jun. 4, 2019

(65) Prior Publication Data

US 2019/0377934 A1 Dec. 12, 2019

(30) Foreign Application Priority Data

Jun. 8, 2018 (TW) .................................. 107119908

(51) Int. Cl.
  *G06K 9/00* (2006.01)
  *H04L 29/08* (2006.01)
  *H04L 67/10* (2022.01)

(52) U.S. Cl.
  CPC ..... *G06K 9/00268* (2013.01); *G06K 9/00221* (2013.01); *H04L 67/10* (2013.01)

(58) Field of Classification Search
  CPC ............. G06K 9/00288; G06K 9/6255; G06K 9/00248; G06N 7/046; G06F 16/436; H04L 25/0254
  USPC .......................... 382/115, 116, 118, 283, 296
  See application file for complete search history.

(56) References Cited

U.S. PATENT DOCUMENTS

| 6,154,879 | A  | * | 11/2000 | Pare, Jr. ............. | G06Q 20/4014 |
| | | | | | 705/35 |
| 6,418,424 | B1 | * | 7/2002 | Hoffberg ................... | G06F 3/00 |
| | | | | | 706/21 |
| 2005/0160113 | A1 | * | 7/2005 | Sipusic ................. | G06F 16/745 |
| 2005/0286743 | A1 | * | 12/2005 | Kurzweil ................ | G06F 3/017 |
| | | | | | 382/114 |

(Continued)

FOREIGN PATENT DOCUMENTS

KR        100745981        8/2007

OTHER PUBLICATIONS

Matsui et., Bayesian Face Recognition using a Markov Chain Monte Carlo Method, 2004, IEEE Computer Society, vol. 3, 918-921 (Year: 2004).*

(Continued)

*Primary Examiner* — Nancy Bitar
(74) *Attorney, Agent, or Firm* — J.C. Patents

(57) ABSTRACT

A face recognition system and a method for enhancing face recognition are provided. The method includes: receiving a face image and obtaining a feature of the face image from a feature extraction model; registering the face image to set the feature of the face image as a first recognition feature; performing a synthesis operation on the face image according to at least one first adjustment parameter to generate a synthetic image, and obtaining a feature of the synthetic image from the feature extraction model; comparing first recognition feature with the feature of the synthetic image to obtain a feature similarity; comparing the feature similarity with a threshold value to obtain a comparison result; and registering the synthetic image when the comparison result indicates that the feature similarity is less than or equal to the threshold value.

15 Claims, 2 Drawing Sheets

(56) References Cited

U.S. PATENT DOCUMENTS

| | | | |
|---|---|---|---|
| 2007/0172099 A1* | 7/2007 | Park | G06K 9/6234 382/118 |
| 2010/0111376 A1* | 5/2010 | Yan | G06K 9/00268 382/118 |
| 2010/0329544 A1* | 12/2010 | Sabe | G06K 9/6256 382/159 |
| 2010/0329556 A1* | 12/2010 | Mitarai | G06K 9/6251 382/170 |
| 2011/0200980 A1* | 8/2011 | Takahashi | G06F 9/453 434/365 |
| 2013/0167168 A1* | 6/2013 | Ellis | H04N 21/25891 725/12 |
| 2013/0225129 A1* | 8/2013 | Norbisrath | H04L 63/105 455/411 |
| 2014/0093142 A1* | 4/2014 | Hayasaka | G06K 9/00221 382/118 |
| 2015/0139492 A1* | 5/2015 | Murakami | G06K 9/3241 382/103 |
| 2017/0039357 A1* | 2/2017 | Hwang | G06K 9/6293 |
| 2017/0206403 A1* | 7/2017 | Rambach | G06K 9/6215 |
| 2018/0217731 A1* | 8/2018 | Ishida | G06F 3/04817 |
| 2018/0276454 A1* | 9/2018 | Han | G06K 9/00281 |
| 2019/0057270 A1* | 2/2019 | Heo | G06K 9/00221 |
| 2019/0114467 A1* | 4/2019 | Liang | G06K 9/00234 |

OTHER PUBLICATIONS

Matsui et al. (Bayesian Face Recognition using a Markov Chain Monte Carlo Method, 2004, IEEE Computer Society, vol. 3, 918921) (Year: 2004).*

Saravan et al. (Facial Expression based Person Authentication, 2014, International Journal of Computer Applications, vol. 94) (Year: 2014).*

* cited by examiner

FACE RECOGNITION SYSTEM AND METHOD FOR ENHANCING FACE RECOGNITION

CROSS-REFERENCE TO RELATED APPLICATION

This application claims the priority benefit of Taiwan application serial no. 107119908, filed on Jun. 8, 2018. The entirety of the above-mentioned patent application is hereby incorporated by reference herein and made a part of this specification.

BACKGROUND

Technology Field

The disclosure relates to a face recognition system and a method for enhancing face recognition, in particular to a face recognition device capable of increasing the recognition success rate and a method for enhancing face recognition.

Description of the Related Art

With the progress of science and technology, a method for enhancing face recognition has become one of main methods for recognition of a user. For increasing the success rate of face recognition, an existing method is to train a deeper neural network and use more training data. However, such a method may increase recognition execution time and an operation burden of the neural network. Another method is to receive more different face images of the user to establish samples to increase the success rate of face recognition. However, such a method may make the user have a bad user experience.

SUMMARY

The present invention provides a face recognition system and a method for enhancing face recognition, which may increase the success rate of face recognition and may maintain relatively good user experience.

According to an embodiment of the present invention, the method for enhancing face recognition includes: receiving a face image, and obtaining a feature of the face image from a feature extraction model; registering the face image to set the feature of the face image as a first recognition feature; performing a synthesis operation on the face image according to at least one first adjustment parameter to generate a synthetic image, and obtaining a feature of the synthetic image from the feature extraction model; comparing the first recognition feature with the feature of the synthetic image to obtain a feature similarity; comparing the feature similarity with a threshold value to obtain a comparison result, wherein the threshold value is generated according to a face recognition error rate; and registering the synthetic image when the comparison result indicates that the feature similarity is less than or equal to the threshold value.

According to an embodiment of the present invention, the face recognition system includes an image extraction device, a feature extraction model and an image processing unit. The image extraction device is configured to extract a face image. The feature extraction model is coupled to the image extraction device. The feature extraction model is configured to receive the face image and obtain a feature of the face image. The image processing unit is coupled to the image extraction device and the feature extraction model. The image processing unit is configured to register the face image to set the feature of the face image as a first recognition feature, perform a synthesis operation on the face image according to at least one first adjustment parameter to generate a synthetic image, obtain a feature of the synthetic image from the feature extraction model, compare the first recognition feature with the feature of the synthetic image to obtain a feature similarity, compare the feature similarity with a threshold value to obtain a comparison result, wherein the threshold value is generated according to a face recognition error rate, and register the synthetic image when the comparison result indicates that the feature similarity is less than or equal to the threshold value.

Based on the above, according to the face recognition system and the method for enhancing face recognition in the embodiment of the present invention, the synthetic image is generated according to the first recognition feature of the face image, and the feature similarity is obtained according to a comparison result of the feature of the synthetic image and the first recognition feature. Then, whether to register the synthetic image to add the feature of the synthetic image or not is determined according to the comparison result of the feature similarity and the threshold value generated according to the face recognition error rate. The feature of the newly added synthetic image may increase the success rate of face recognition and may maintain relatively good user experience.

In order to make the aforementioned features and advantages of the present invention comprehensible, embodiments accompanied with the accompanying drawings are described in detail below.

DETAILED DESCRIPTION

Figure 1:
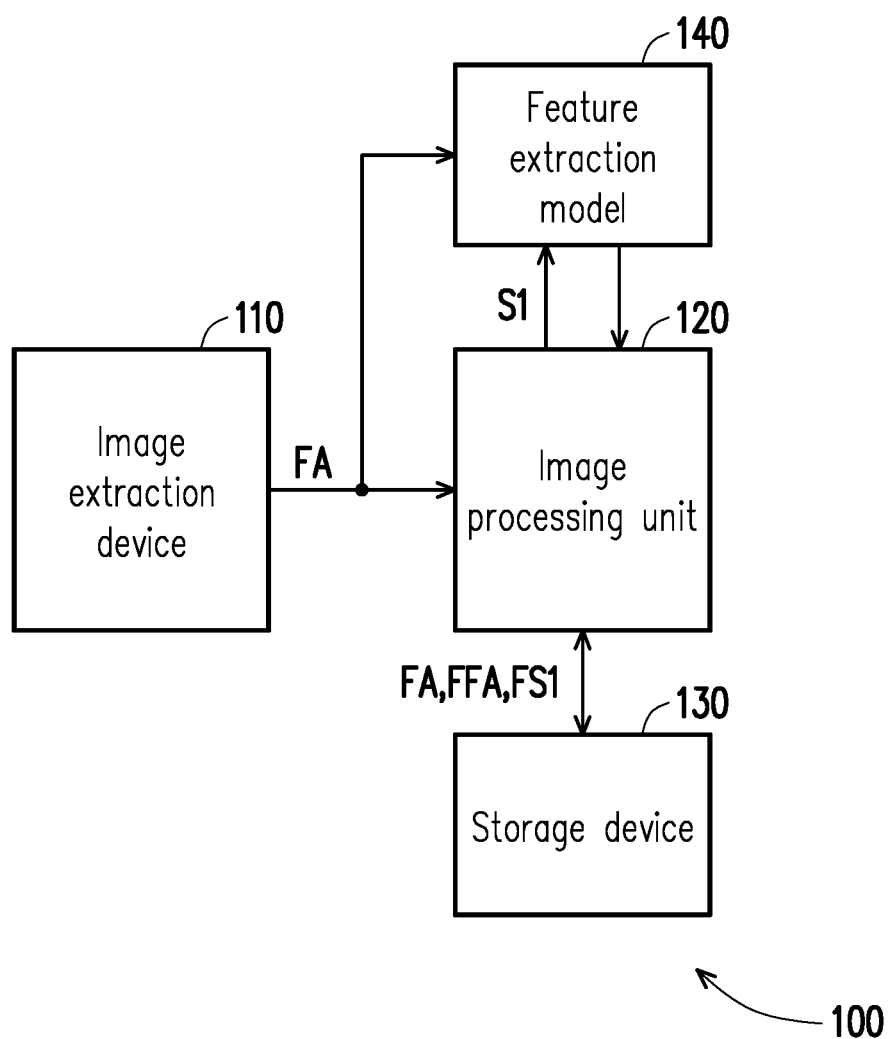
FIG. 1 is a schematic diagram of a face recognition system according to an embodiment of the present invention.

Referring to FIG. 1, FIG. 1 is a schematic diagram of a face recognition system according to an embodiment of the present invention. In the embodiment of FIG. 1, the face recognition system 100 includes an image extraction device 110, an image processing unit 120, a storage device 130 and a feature extraction model 140. The image extraction device 110 is configured to extract a face image FA, and may be a photographic device, such as an industrial video camera, an infrared video camera and a colour video camera. The feature extraction model 140 may be, for example, a face recognition model established by a neural network, and is coupled to the image extraction device 110 and configured to receive the face image FA to generate a feature of the face image FA. In the embodiment of the present invention, the feature extraction model 140 may be integrated in the image processing unit 120 or integrated in a cloud server. The feature of the face image FA may be a 512-dimensional vector. The image processing unit 120 is coupled to the image extraction device 110 and the feature extraction model 140, and is configured to receive the face image FA from the image extraction device 110, obtain the feature of the face image FA from the feature extraction model 140 and register the face image FA to set the feature of the face image FA as a first recognition feature FFA. The image processing unit 120 performs a synthesis operation on the face image FA to generate a synthetic image S1 and transmits the synthetic image S1 to the feature extraction model 140. The feature extraction model 140, after receiving the synthetic image S1, generates a feature of the synthetic image S1. The image processing unit 120 obtains the feature of the synthetic image S1 from the feature extraction model 140. Then, the image processing unit 120 compares the first recognition feature FFA with the feature of the synthetic image S1 to determine whether to register the newly added synthetic image S1 or not. The image processing unit 120 may be a central processing unit (CPU), or other programmable microprocessor for a general purpose or a special purpose, a digital signal processor (DSP), a programmable controller, an application-specific integrated circuit (ASIC), a programmable logic device (PLD) or other similar device or a combination of these devices, and may load and execute a computer program to implement a corresponding operation function. The storage device 130 is coupled to the image processing unit 120, and is configured to store the registered face image FA and store the first recognition feature FFA corresponding to the face image FA. The storage device 130 may be any type of fixed or mobile random access memory (RAM), read-only memory (ROM), flash memory or similar component or a combination of the components.

Figure 2:
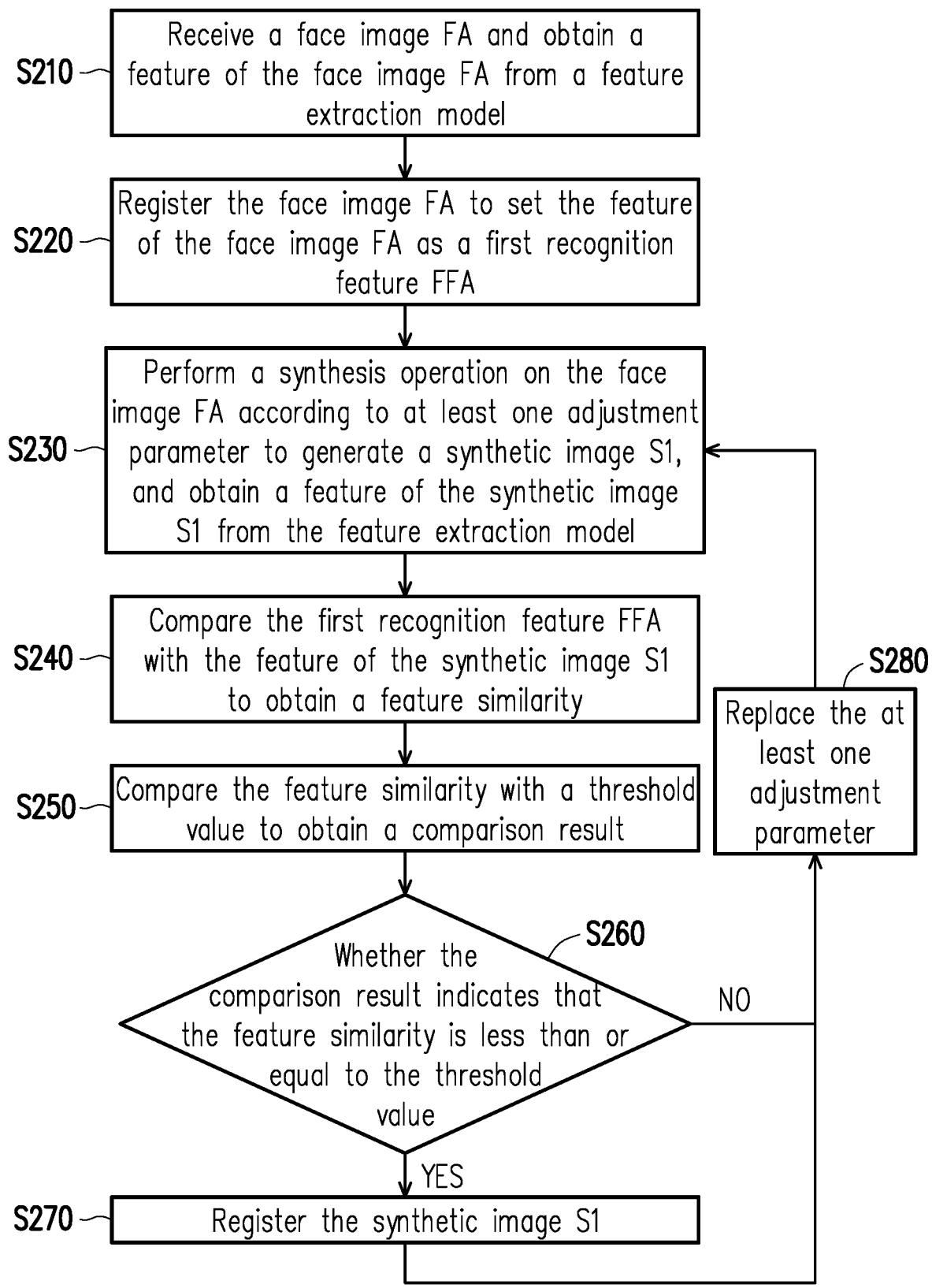
FIG. 2 is a flowchart of a method for enhancing face recognition according to an embodiment of the present invention.

Referring to both FIG. 1 and FIG. 2, FIG. 2 is a flowchart of a method for enhancing face recognition according to an embodiment of the present invention. In the embodiment of FIG. 1 and FIG. 2, as described in Step S210: the face image FA is received from the image extraction device 110, and the feature of the face image FA is obtained from the feature extraction model 140. Specifically speaking, after the image extraction device 110 and the feature extraction model 140 receive the face image FA from the image extraction device 110, the feature extraction model 140 generates the feature of the face image FA. The image processing unit 120 obtains the feature of the face image FA from the feature extraction model 140.

As described in Step S220: the image processing unit 120 registers the face image FA to set the feature of the face image FA as the first recognition feature FFA. In Step S210, the image extraction device 110 extracts the face image FA and provides the face image FA for the image processing unit 120. In Step S220, the image processing unit 120, after receiving the face image FA, registers the face image FA. In the embodiment of the present invention, when a user is intended to register for the face recognition system 100, the image extraction device 110 photographs the user at first to obtain the face image FA of the user. Moreover, during the registration procedure, the image processing unit 120 sets the feature of the face image FA as the first recognition feature FFA.

As described in Step S230: the face image FA is synthesized according to at least one adjustment parameter to generate the synthetic image S1, and the feature of the synthetic image S1 is obtained from the feature extraction model 140. For example, the at least one adjustment parameter may be pre-set in the image processing unit 120. In addition, the image processing unit 120 may generate the at least one adjustment parameter by use of at least one of a random manner, a Monte Carlo algorithm and a genetic algorithm.

In an embodiment of the present invention, the adjustment parameter may be a parameter configured to change contrast of the face image FA. For example, the image processing unit 120 may increase the contrast of the face image FA by 1%-60% or decrease it by 1%-60% according to the adjustment parameter to generate the synthetic image S1. In another embodiment of the present invention, the adjustment parameter may be a parameter configured to change brightness of the face image FA. For example, the image processing unit 120 may increase the brightness of the face image FA by 1%-40% or decrease it by 1%-40% according to the adjustment parameter to generate the synthetic image S1. In another embodiment of the present invention, the adjustment parameter may be a parameter configured to rotate the face image FA in different rotating angles in a simulation manner. For example, the image processing unit 120 may rotate the face image FA rightwards for 1-45 degrees or rotate it leftwards for 1-45 degrees according to the adjustment parameter to generate the synthetic image S1. In another embodiment of the present invention, the adjustment parameter may also be a cover image. The cover image is, for example, one of a glasses image, hair image, beard image and mask image in various forms or any combination of the glasses image, the hair image, the beard image and the mask image. For example, the image processing unit 120 may cover a part of area of the face image FA with the cover image according to the adjustment parameter to generate the synthetic image S1.

In the present embodiment, the image processing unit 120 may synthesize the face image FA according to multiple adjustment parameters at the same time. For example, the image processing unit 120 may decrease the contrast of the face image FA by 30%, rotate the face image FA leftwards for 30 degrees in the simulation manner and cover a part of area of the face image FA with the mask image according to multiple adjustment parameters to generate the synthetic image S1.

It is to be noted that the adjustment parameter has an adjustment limit to prevent distortion of the synthetic image S1. In the aforementioned examples, an adjustment upper limit of the contrast is, for example, increase/decrease by 60%; an adjustment upper limit of the brightness is, for example, increase/decrease by 40%; and an adjustment upper limit of rotating angle simulation is, for example, 45-degree rightward/leftward; and an upper limit of a coverage ratio for covering the face image FA with the cover image is, for example, 40%.

In the present embodiment, the synthetic image S1 may be configured to simulate face features of the user in various situations. For example, the face features of the user in a situation with different light conditions (for example, insufficient light), or a situation that a face is turned or a situation in which the user wears glasses and a mask or grows a beard are simulated.

It is to be noted herein that the image processing unit 120 may synthesize a single face image FA to generate multiple synthetic images (including the synthetic image S1). Therefore, the user may provide only one face image FA for the face recognition system 100 to generate multiple synthetic images of the user in various situations.

After the image processing unit 120 generates the synthetic image S1, the image processing unit 120 transmits the synthetic image S1 to the feature extraction model 140. After the feature extraction model 140 generates the feature of the synthetic image S1, the image processing unit 120 obtains the feature of the synthetic image S1 from the feature extraction model 140.

As described in Step S240: the first recognition feature FFA is compared with the feature of the synthetic image S1 to obtain a feature similarity. In Step S240, the image processing unit 120 compares the first recognition feature FFA with the feature of the synthetic image S1 to obtain the feature similarity between the first recognition feature FFA and the feature of the synthetic image S1. In Step S240, the image processing unit 120 may compare the first recognition feature FFA with the feature of the synthetic image S1. The more the first recognition feature FFA is similar to the feature of the synthetic image S1, the higher the feature similarity is. On the contrary, the less the feature of the first recognition feature FFA is similar to the feature of the synthetic image S1, the lower the feature similarity is. A numerical value of the feature similarity may range from −1 to 1. For example, when the feature similarity is 1, it indicates that the first recognition feature FFA is completely the same as the feature of the synthetic image S1. When the feature similarity is −1, it indicates that the first recognition feature FFA is completely different from the feature of the synthetic image S1.

As described in Step S250: the feature similarity is compared with a threshold value to obtain a comparison result. In Step S250, the image processing unit 120, after obtaining the feature similarity, may compare the feature similarity with the threshold value to obtain the comparison result. In the embodiment of the present invention, the threshold value of the feature similarity is defined by an extremely low face recognition error rate (approximating zero). For example, if the face recognition error rate (which is, for example, lower than 0.01%) is extremely low or approximates zero when the feature similarity is 0.7, 0.7 is defined as the threshold value.

As described in Step S260: the comparison result indicates whether the feature similarity is less than or equal to the threshold value or not. That is, the image processing unit 120 may determine whether the registered face image FA is similar to the synthetic image S1 or not according to the comparison result of the feature similarity and the threshold value. When the image processing unit 120 determines that the feature similarity is lower than the threshold value, it indicates that the registered face image FA is not similar to the synthetic image S1. On the contrary, when the image processing unit 120 determines that the feature similarity is higher than the threshold value, it indicates that the registered face image FA is similar to the synthetic image S1. In Step S260, if the comparison result indicates that the feature similarity is less than or equal to the threshold value, go to Step S270 is performed. In Step S270, the image processing unit 120 registers the synthetic image S1 to set the feature of the synthetic image S1 as a second recognition feature FS1. That is, when the registered face image FA is not similar to the synthetic image S1, the feature of the dissimilar synthetic image S1 may be set as the second recognition feature FS1 in the embodiment of the present invention, so that the probability that the user passes face recognition in different situations gets higher. Therefore, the face recognition system 100 may perform face recognition on the user by use of the first recognition feature FFA and the second recognition feature FS1. In addition, the storage device 130 may store the second recognition feature FS1.

In the prior art, when the feature similarity is less than or equal to the threshold value, the image processing unit 120 may determine that the first recognition feature FFA and the feature of the synthetic image S1 are not from the same user, which may cause a face recognition failure. That is, according to the prior art, the user may fail in face recognition in a situation corresponding to the synthetic image S1. For example, the user wearing glasses may fail in face recognition in a situation of insufficient light. However, in the prior art, a failure of the same user in face recognition in different situations is an erroneous result of the face recognition. By contrast, the image processing unit 120 of the present invention may set the feature of the synthetic image S1 having the feature similarity less than or equal to the threshold value as the second recognition feature FS1 and store the second recognition feature FS1 in the storage device 130 to increase recognition features of the user. In such a manner, the user may pass face recognition in different situations through the face recognition system 100 of the present invention to increase the success rate of face recognition.

After the image processing unit 120 completes registration of the synthetic image S1 in Step S270 of the present embodiment, Step S280 may be performed.

As described in Step S280: the at least one adjustment parameter is replaced. In Step S280, the image processing unit 120 may replace the at least one adjustment parameter with one or more new adjustment parameters to generate more synthetic images. In the present embodiment, one or more new adjustment parameters may be generated by use of at least one of the random manner, the Monte Carlo algorithm and the genetic algorithm, and may also be generated according to the original adjustment parameter. For example, the original adjustment parameter is to increase the contrast of the face image FA by 30%. The image processing unit 120 may implement adjustment according to the adjustment parameter to increase or decrease the amplitude of the contrast to generate a new adjustment parameter which can increase the contrast of the face image FA by 15% or 60%.

After Step S280, the image processing unit 120 may return to Step S230 to synthesize the face image FA according to one or more new adjustment parameters to generate another synthetic image and obtain a feature of the new synthetic image from the feature extraction model 140. Then, the image processing unit 120 may execute Steps S230-S280 to obtain more recognition features.

Back to Step S260, if the comparison result indicates that the feature similarity is higher than the threshold value, the image processing unit 120 may not register the synthetic image S1 and enters Step S280. Under the condition that the comparison result indicates that the feature similarity is higher than the threshold value, the image processing unit 120 may replace the original adjustment parameter with the new adjustment parameter in Step S280 to synthesize the face image FA in a more dramatic manner. For example, the image processing unit 120 increases the contrast of the face image FA by 30% according to the adjustment parameter to generate the synthetic image S1. However, the image processing unit 120 determines in Step S260 that the feature similarity between the first recognition feature FFA and the feature of the synthetic image S1 is higher than the threshold value. The image processing unit 120 replaces the adjustment parameter with a new adjustment parameter in Step S280 to increase the contrast of the face image FA by 60%. The image processing unit 120 may generate a new synthetic image S2 (not shown) according to the new adjustment parameter or other additional adjustment parameters and obtain a feature thereof in Step S230. Then, in Step S240, a feature of the new synthetic image S2 may form a relatively low feature similarity with the first recognition feature FFA, and in Steps S250-S270, the image processing unit 120 registers the new synthetic image S2 when the feature similarity is less than or equal to the threshold value.

Based on the above, according to the face recognition system and the method for enhancing face recognition in the present invention, multiple synthetic images are generated according to the face image, the feature similarity is obtained according to the feature of the first recognition feature of the face image and the feature of the synthetic image, and whether to set the feature of the synthetic image as the second recognition feature or not is determined according to the comparison result of the feature similarity and the threshold value. The newly added second recognition feature may be configured to increase the success rate of face recognition and may maintain relatively good user experience.

Although the embodiments of the present invention have been disclosed above but are not intended to limit the present invention. Those of ordinary skill in the art may make some modifications and embellishments without departing from the spirit and scope of the present invention. Therefore, the scope of protection of the present invention should be subject to the appended claims.

What is claimed is:

1. A method for enhancing face recognition, comprising:
receiving a face image of a user, and obtaining a feature of the face image from a feature extractor;
registering the face image to set the feature of the face image as a first recognition feature;
performing a synthesis operation on the face image according to at least one first adjustment parameter to generate a synthetic image of the user, and obtaining a feature of the synthetic image from the feature extractor;
comparing the first recognition feature with the feature of the synthetic image of the user to obtain a feature similarity;
comparing the feature similarity with a threshold value to obtain a comparison result, wherein the threshold value is generated according to a face recognition error rate, wherein the threshold value of the feature similarity is defined when the face recognition error rate approximates zero; and
registering the synthetic image of the user when the comparison result indicates that the feature similarity is less than or equal to the threshold value, so as to add a second recognition feature corresponding to the synthetic image of the user.

2. The method for enhancing face recognition according to claim 1, wherein registering the face image comprises:
storing the first recognition feature and the face image.

3. The method for enhancing face recognition according to claim 1, wherein the at least one first adjustment parameter is generated by use of at least one of a Monte Carlo algorithm and a genetic algorithm.

4. The method for enhancing face recognition according to claim 1, wherein the synthesis operation is to change a contrast, brightness and simulate rotating angles of the face image according to the at least one first adjustment parameter.

5. The method for enhancing face recognition according to claim 1, wherein the synthesis operation is to cover a part of area of the face image with a cover image according to the at least one first adjustment parameter.

6. The method for enhancing face recognition according to claim 1, wherein the step of registering the synthetic image comprises:
setting the feature of the synthetic image as the second recognition feature; and
storing the second recognition feature.

7. The method for enhancing face recognition according to claim 1, further comprising:
when the comparison result indicates that the feature similarity is higher than the threshold value, performing the synthesis operation on the face image according to at least one second adjustment parameter to generate another synthetic image.

8. A face recognition system, comprising:
a camera, configured to extract a face image of a user;
a feature extractor, coupled to the camera and configured to receive the face image and obtain a feature of the face image; and
an image processor, coupled to the camera and the feature extractor, wherein the image processor is configured to:
register the face image to set the feature of the face image as a first recognition feature;
perform a synthesis operation on the face image according to at least one first adjustment parameter to generate a synthetic image of the user and obtain a feature of the synthetic image from the feature extractor;
compare the first recognition feature with the feature of the synthetic image of the user to obtain a feature similarity;
compare the feature similarity with a threshold value to obtain a comparison result, wherein the threshold value is generated according to a face recognition error rate, wherein the threshold value of the feature similarity is defined when the face recognition error rate approximates zero; and
register the synthetic image of the user when the comparison result indicates that the feature similarity is less than or equal to the threshold value, so as to add a second recognition feature corresponding to the synthetic image of the user.

9. The face recognition system according to claim 8, further comprising:
A memory, coupled to the image processor, the memory being configured to store the first recognition feature and the face image.

10. The face recognition system according to claim 8, wherein the at least one first adjustment parameter is generated by use of at least one of a Monte Carlo algorithm and a genetic algorithm.

11. The face recognition system according to claim 8, wherein the synthesis operation is to change a contrast, brightness and simulate rotating angles of the face image according to the at least one first adjustment parameter.

12. The face recognition system according to claim 8, wherein the synthesis operation is to cover a part of area of the face image with a cover image according to the at least one first adjustment parameter.

13. The face recognition system according to claim 9, wherein the operation that the image processor registers the synthetic image comprises that the image processor sets the feature of the synthetic image as the second recognition feature and stores the second recognition feature in the memory.

14. The face recognition system according to claim 8, wherein, when the comparison result indicates that the feature similarity is higher than the threshold value, the image processor performs a synthesis operation on the face image according to at least one second adjustment parameter to generate another synthetic image.

15. The face recognition system according to claim 8, wherein the feature extractor is integrated in the image processor or integrated in a cloud server.

* * * * *